United States Patent [19]

Wiese

[11] 4,241,927
[45] Dec. 30, 1980

[54] MECHANICAL SEAL

[75] Inventor: Winfred J. Wiese, Whittier, Calif.

[73] Assignee: Borg-Warner Corporation, Chicago, Ill.

[21] Appl. No.: 66,102

[22] Filed: Aug. 13, 1979

[51] Int. Cl.³ .............................................. F16J 15/38
[52] U.S. Cl. .................................. 277/87; 277/76; 277/93 SD
[58] Field of Search .................. 277/11, 75, 76, 81 R, 277/82, 85, 87, 93 R, 93 SD

[56] References Cited

U.S. PATENT DOCUMENTS

| | | | |
|---|---|---|---|
| 2,378,095 | 6/1945 | Payne | 277/87 |
| 2,928,685 | 3/1960 | Tracy | 277/93 X |
| 3,042,414 | 7/1962 | Tracy | 277/11 |
| 3,433,489 | 3/1969 | Wiese | 277/75 X |
| 3,486,760 | 12/1969 | Tracy | 277/75 X |
| 3,897,957 | 8/1975 | Warner | 277/85 |

Primary Examiner—Robert S. Ward, Jr.
Attorney, Agent, or Firm—Aubrey L. Burgess

[57] ABSTRACT

An improved mechanical seal in which the elastomer U-cup has a controlled contact area with a rotating member and the cavity for receiving the U-cup is contoured without the conventional, relatively sharp axially extending lip. A low coefficient of friction exists between the U-cup and the rotating member, providing improved life to the seal assembly.

The cavity in one of the seal rings is formed with defining walls having portions normal to each other and to the intersected surfaces of the seal ring, one of the defining surfaces being normal to the rotatable shaft. The U-cup has a surface in full contact with the cavity defining wall; the controlled contact area being a cylindrical surface contacting the rotatable shaft.

4 Claims, 5 Drawing Figures

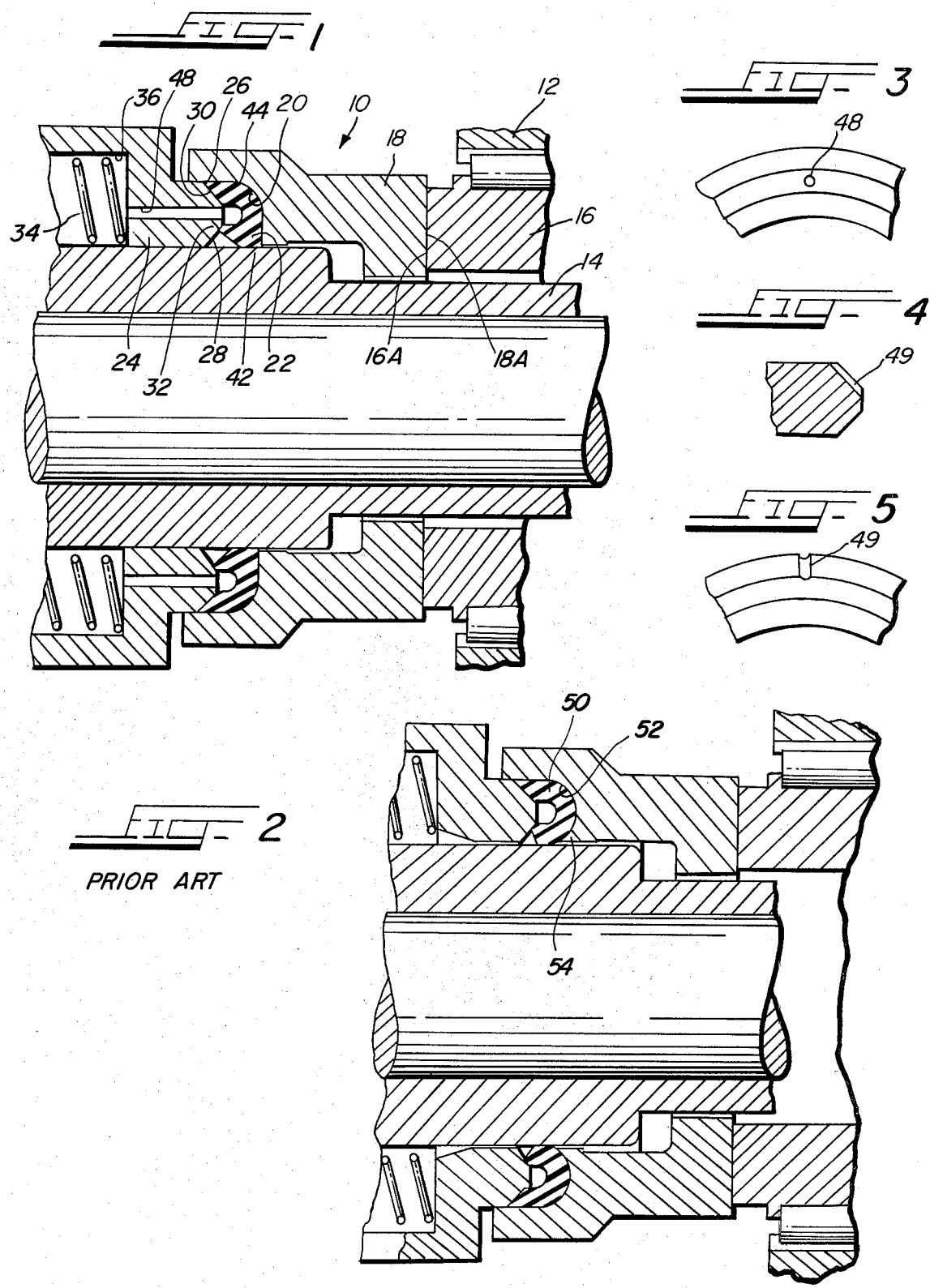

MECHANICAL SEAL

BACKGROUND OF THE INVENTION

In conventional mechanical seals, such as shown in U.S. Pat. No. 3,042,414, an elastomer U-cup or packing ring, as it is referred to in the patent, is received in a seat provided in one of the seal rings surrounding a shaft sleeve. A spring pressed expander ring expands the U-cup such that its outer surface conforms to its seat and also is in full contact with the shaft sleeve. Because of the springs, the U-cup must slide relative to the shaft sleeve and with full area contact, the frictional forces are quite high. The lip of the seal can also have a relatively sharp edge which can shear the elastomer U-cup and cause premature failure of the seal.

THE INVENTION

An improved U-cup and seat configuration providing a controlled contact area such that the frictional forces between the U-cup and the rotating member along which movement occurs is controlled and of a relatively low value; also, the elimination of the relatively sharp lip on the seat leading to increases life of the seal.

THE DRAWINGS

FIG. 1 is a partial sectional view of a mechanical seal according to this invention;

FIG. 2 is a view similar to FIG. 1 but showing the prior art, as indicated by the indicia.

FIG. 3 is an end view of one form of expander ring; and

FIGS. 4 and 5 are end and sectional views, respectively, of another form of expander ring.

DETAILED DESCRIPTION

FIG. 1, to which attention is invited, shows a mechanical seal 10 comprising a housing 12 and a rotating member 14 which may be a shaft but is usually a sleeve which surrounds a shaft, a stationary seal ring 16 keyed to the housing 12 and a rotating seal ring 18, the latter rotating with the member 14. The seal rings 16 and 18 have contacting seal faces 16A, 18A.

The seal ring 18 is provided with a cavity 20 to receive an elastomeric U-cup seal member 22. An expander ring 24 has a terminal end which has a pair of annular surfaces 26, 28 in contact with surfaces 30, 32 of the U-cup 22. The expander ring 24 is resiliently urged toward the stationary ring 16 by springs 34 received in spring pockets 36. The expander ring 24 urges the rotating ring 18, through the U-cup 22 toward the stationary ring 16.

The U-cup is constructed with a surface 42 for contact with the shaft or shaft sleeve 14 and a surface 44 which contacts the wall of the cavity 20 throughout its length, in addition to the surfaces 30, 32. The cavity 20 has a defining wall with portions normal to each other and to the intersected surfaces of the seal ring 18, one of the cavity wall portions also being normal to the rotating member 14. Because of the construction of the U-cup 22, the cylindrical surface 42 remains substantially constant—it can be considered as a controlled contact surface with the member 14.

One or more passages 48 (see also FIG. 3) are provided through the expander ring 24, so as to provide a pressure at the rear of the U-cup to seat the surfaces 42 and 44 on the wall of the cavity 20 and the shaft or shaft sleeve 14, respectively.

As an alternative construction, one or more passages or grooves 49 can be provided in the face or surface 26 of the expander ring instead of the U-cup. This structure is illustrated in FIGS. 4 and 5.

The U-cup 22 can be compared with the U-cup 50 of the prior art by reference to FIG. 2. As can be seen the cavity 52 into which the U-cup fits is defined, at least in part, by a rearwardly directed lip 54. Thus when pressure is applied to the U-cup 50 the surface engaging the shaft becomes larger, changing the frictional relationship with the shaft. The lip 54 is generally sharp, a situation which can cause shearing of the U-cup 50.

I claim:

1. In a mechanical seal assembly having non-rotatable and rotatable seal rings with opposed faces, means supporting said rings, a cavity in one of said seal rings removed from its seal face to receive a U-cup member of elastomeric material, and means urging said U-cup member into said cavity and also one of said seal rings toward the other of said seal rings, the improvement comprising:

said cavity having a defining surface which intersects a pair of surfaces of said one seal ring which are normal to one another and defines a substantially right angle with each surface of said pair of surfaces;

said U-cup having a surface in full contact with said defining surface and a cylindrical surface in contact with said supporting means, said cylindrical surface remaining substantially constant in length for all operating conditions of said seal assembly.

2. In a mechanical seal assembly as recited in claim 1 where said cylindrical surface is substantailly normal to one portion of said defining surface and to one portion of said full contact surface of said U-cup.

3. In a mechanical seal as recited in claim 1 further comprising means for providing a pressure to one surface of said U-cup member urging said U-cup member into said cavity.

4. In a mechanical seal as recited in claim 3 in which said means for providing said pressure comprises passages in said urging means for the passage of a fluid pressure to said U-cup member.

* * * * *